United States Patent
Sullivan et al.

[11] Patent Number: 6,093,431
[45] Date of Patent: Jul. 25, 2000

[54] PRE-COOKED SANDWICH PACKAGING AND METHOD OF REHEATED SALE

[75] Inventors: B. Keith Sullivan; Steven A. Corley, both of Ooltewah, Tenn.

[73] Assignee: Made-Rite Sandwich Company of Chattanooga, Inc., Ooltewah, Tenn.

[21] Appl. No.: 09/045,006

[22] Filed: Mar. 20, 1998

[51] Int. Cl.[7] ............................. A21D 13/08; B65B 11/02
[52] U.S. Cl. ..................... 426/118; 426/396; 426/410; 426/413
[58] Field of Search ..................... 426/396, 410, 426/413, 118, 243

[56] References Cited

U.S. PATENT DOCUMENTS

| | | | |
|---|---|---|---|
| Re. 35,241 | 5/1996 | Capy et al. | 426/111 |
| 2,939,793 | 6/1960 | Richman | 426/107 |
| 3,964,669 | 6/1976 | Sontag et al. | 426/107 |
| 4,002,773 | 1/1977 | Entenmann | 426/302 |
| 4,355,721 | 10/1982 | Knott, II et al. | 206/524.2 |
| 4,606,922 | 8/1986 | Schirmer | 426/412 |
| 4,608,302 | 8/1986 | Schirmer | 428/349 |
| 4,735,513 | 4/1988 | Watkins et al. | 383/116 |
| 4,792,457 | 12/1988 | Brna et al. | 426/574 |
| 4,839,180 | 6/1989 | Standerwick et al. | 426/115 |
| 5,464,279 | 11/1995 | Wells et al. | 312/128 |
| 5,514,392 | 5/1996 | Garwood | 426/106 |
| 5,553,934 | 9/1996 | Wells et al. | 312/128 |
| 5,731,023 | 3/1998 | Milani | 426/410 |

*Primary Examiner*—Nina Bhat
*Attorney, Agent, or Firm*—Miller & Martin LLP

[57] ABSTRACT

A new and improved biscuit sandwich and method of packaging and merchandising is provided. A biscuit with high fat content of about 20% by weight is individually wrapped in the form of a biscuit sandwich packaged in a modified atmosphere process, refrigerated and distributed to store locations where it can be reheated and placed in a heated merchandiser for sale. The heated merchandiser therefore provides consumers with a home-style biscuit sandwich in stores without cooking facilities, and permits the self-service purchase of the pre-cooked and reheated biscuit sandwiches.

18 Claims, 4 Drawing Sheets

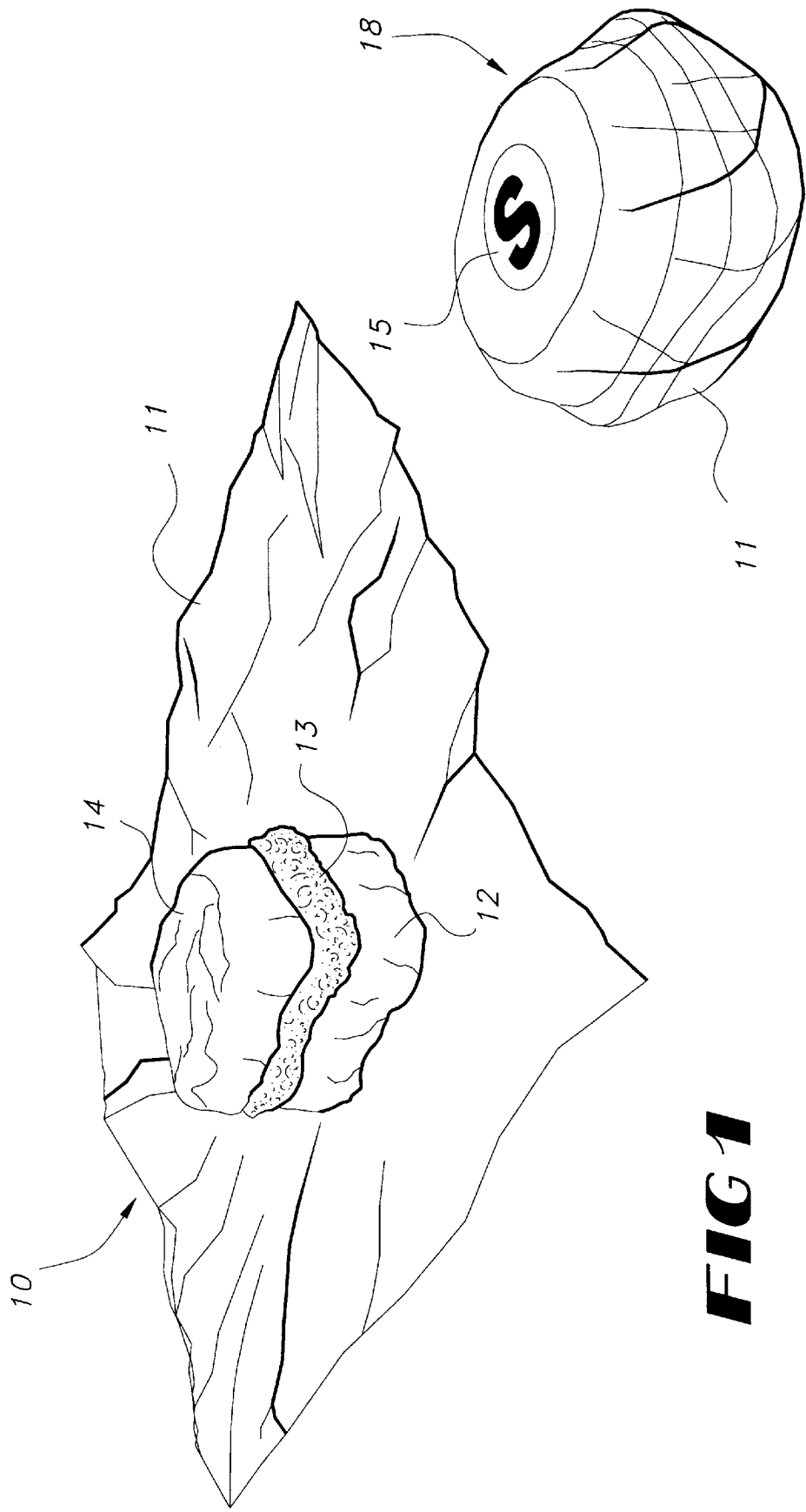

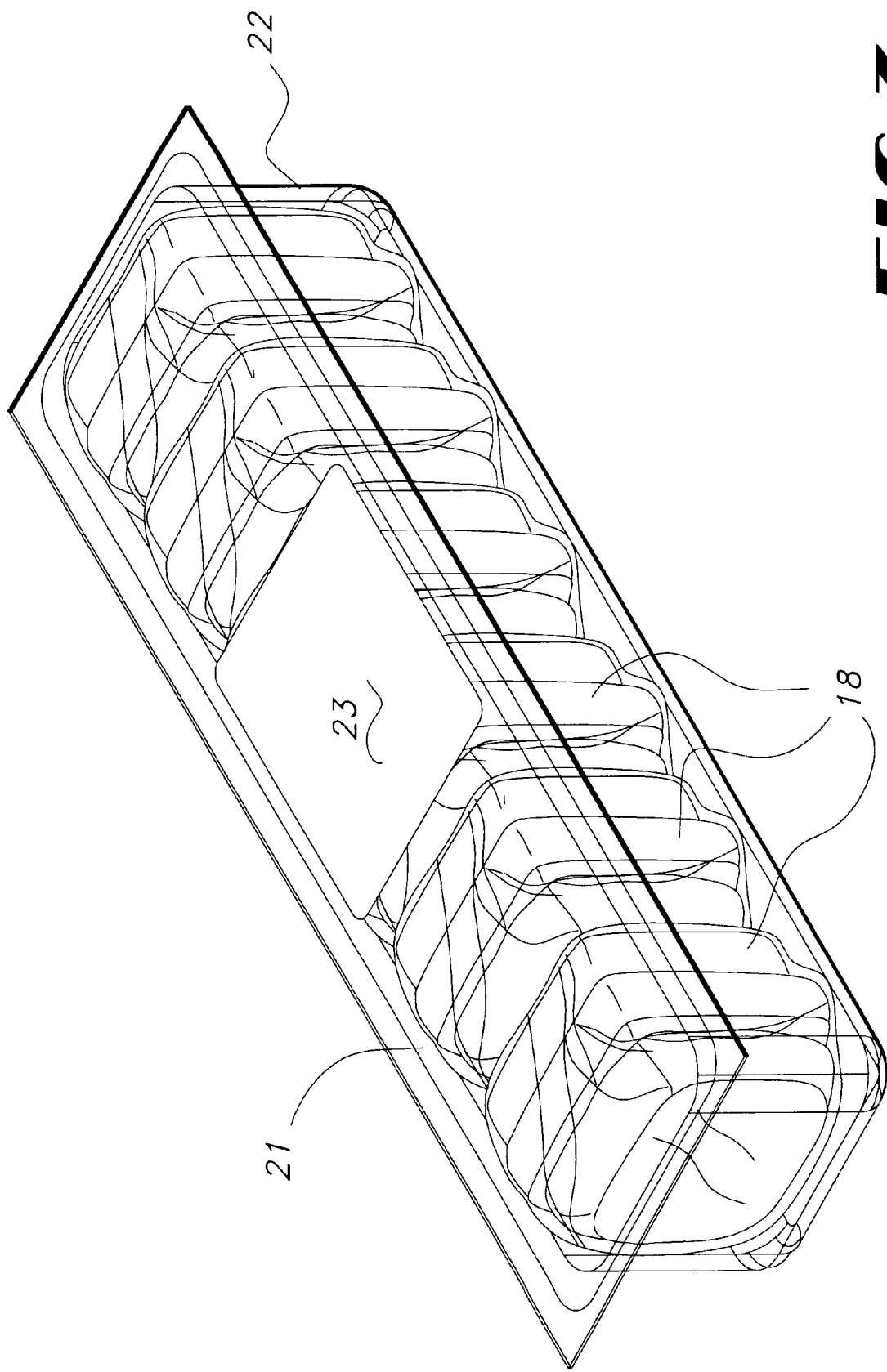

PRE-COOKED SANDWICH PACKAGING AND METHOD OF REHEATED SALE

BACKGROUND OF THE INVENTION

The present invention relates to the packaging of pre-cooked sandwiches and a method for their distribution by being reheated and placed in heated merchandisers.

A popular fast food breakfast item is a biscuit sandwich, typically containing ham, sausage, or steak. Fast food restaurants cook such biscuit sandwiches on site, either to order, or slightly in advance of the order, and then maintain the biscuits in heated holding bins. Gas stations, convenience stores, quick service food marts, airport shops, and other small retail locations without kitchen facilities, compete for these breakfast sales. Heretofore, such locations have been unable to present the consumer with completely satisfactory biscuit sandwiches. The most typical competitive biscuit offerings have been sold in a refrigerated state to the consumer in sealed, clear plastic packaging, with one or two biscuits per package. Such sandwiches usually weigh no more than about 2 ounces, have had bread-like biscuit components relatively low in fat content, and must be unwrapped and heated by the consumer in a microwave provided by the retail outlet. The microwaving step takes time, and some customers do not want to wait, thereby removing the convenience aspect of the biscuit item. Furthermore, the bread-like biscuit portion is not as desirable as a higher fat, home-made style biscuit. Another competitive solution has been attempted in U.S. Pat. No. 5,553,934 wherein a specially designed merchandiser and specially designed individual thermoplastic packaging for sandwiches, including breakfast items such as sausage and biscuit combinations is contemplated. The cost of the special merchandiser and packaging appears to be a disadvantage of this approach. Alternative bulk packaging of 4, 6, 12 and 24 biscuit sandwiches in cardboard boxes for reheating by consumers in their homes also exist. These biscuit sandwiches are also typically only about 2 ounces in size and are generally grouped in pairs in plastic packages within the larger cardboard box. Some biscuit sandwiches are made larger, up to about 3-¼ ounces and are individually packaged in plastic within a larger cardboard box. No refrigerated biscuit sandwich products are known to be individually wrapped in paper.

In order to present a satisfactory product, many factors must be addressed. The biscuit and meat components of the sandwich must be selected such that they will have a substantial shelf life when properly packaged, and such that when reheated and placed in a heated merchandiser will not deteriorate too rapidly. In addition, packaging for the biscuit sandwiches must be inexpensive, preferably transparent and microwavable, flexible, and providing a barrier to oxygen and moisture, as well as sufficient toughness for casual handling and storage for a 3 to 5 week period. In addition, the biscuit sandwiches should preferably be individually wrapped with a wax paper or other grease-resistant yet slightly absorbent wrapper for consumer convenience in handling the re-heated sandwich products. Finally, the re-heated sandwich products must be presented in a heated merchandising device which displays the products in view of consumers to stimulate buying, preferably permitting aroma of the sandwich products to permeate the surrounding area. Furthermore, because demand is uncertain, the merchandising device must also maintain the sandwich products in a heated, palatable condition during several hours of display.

SUMMARY OF THE INVENTION

Accordingly, it is an object of the invention to provide an improved biscuit sandwich for packaging and subsequent reheating and sale from a heated merchandiser. It is a further object of the invention to provide improved packaging for biscuit sandwiches which are to be reheated and sold from a heated merchandiser.

It is yet another object of the invention to provide an improved method of distributing and selling pre-cooked biscuit sandwiches from retail outlets that do not have on-site kitchen capabilities.

It is still another object of the present invention to provide packaged, pre-cooked biscuit sandwiches for reheating and sale at a self-service counter top food display station without requiring additional handling or assistance by store personnel.

In accordance with these objects of the invention, biscuit sandwiches with a pre-cooked meat component and home-made style biscuit component having fat content of about 20% by weight is provided. These biscuits are wrapped in wax paper in plastic web sleeves with modified atmospheres, wherein the sleeves provide barriers against moisture and oxygen sufficient to provide a refrigerated shelf life of at least 20 days. The packaged biscuit sandwiches are distributed to retail store locations with instructions describing reheating of the product and placement of the product in a heated merchandiser from which customers may make their selections without assistance by store personnel.

BRIEF DESCRIPTION OF THE DRAWINGS

FIG. 1 is a perspective view of an assembled biscuit sandwich ready for wrapping;

FIG. 2 is a perspective view of an individually wrapped biscuit sandwich;

FIG. 3 is a perspective view of a package of wrapped biscuit sandwiches in a plastic web sleeve according to the present invention;

DETAILED OF THE PREFERRED EMBODIMENTS

Figure 4:
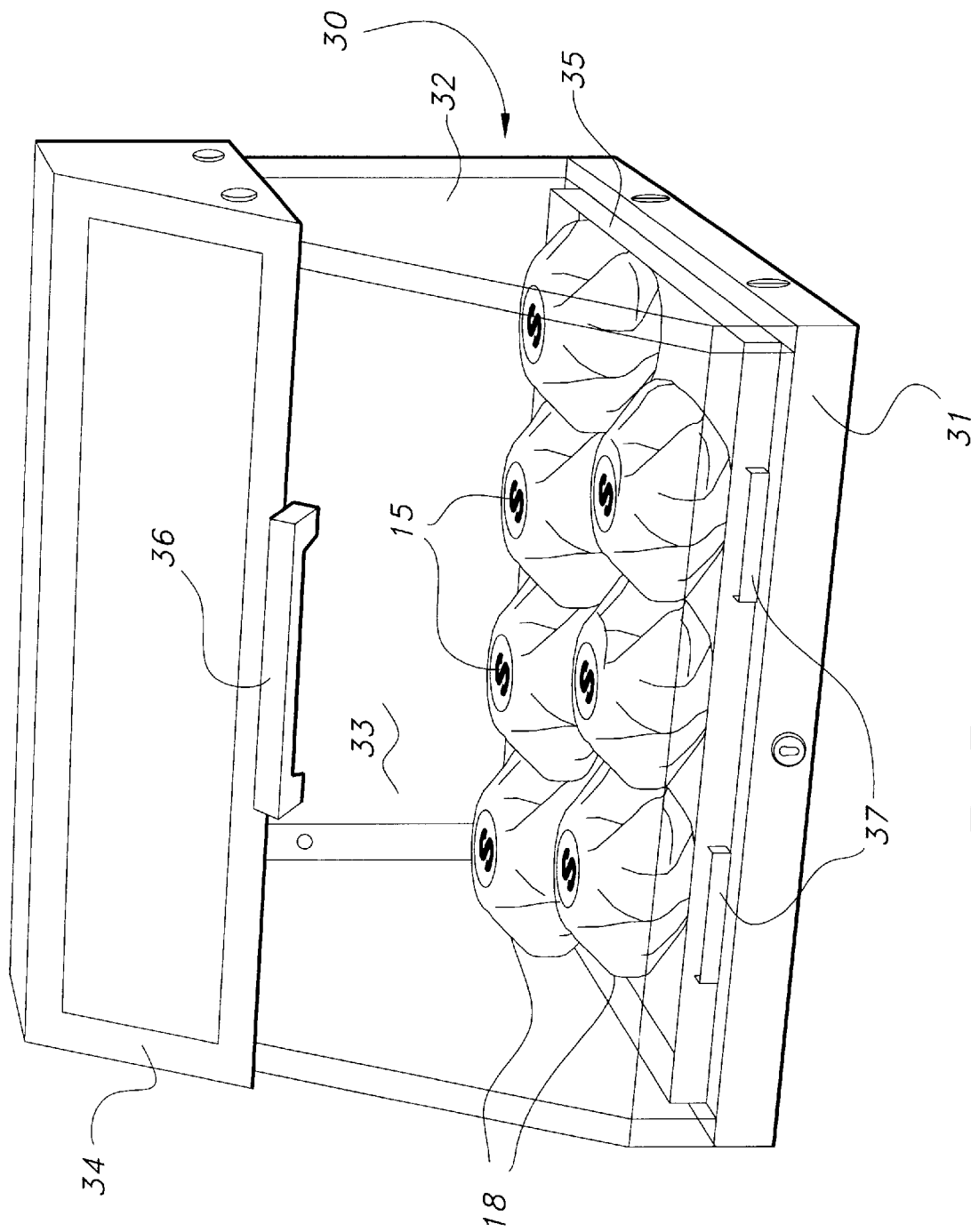
FIG. 4 is a perspective view of a plurality of heated biscuit sandwiches placed for sale in a heated merchandiser according to the present invention.

FIG. 1 shows a typical biscuit sandwich 10, comprising a bottom 12, top 14, and a meat portion 13 in between. The meat portion 13 will typically be sausage, chicken, steak or ham, and is already cooked at the time the biscuit sandwich is assembled. Central to the success of the product is the formulation of the biscuit components 12, 14, which are in the style of a home-made biscuit, rather than a bread-like bun as is typical of many packaged refrigerated or frozen biscuits. The home-made style biscuit is distinguished by its size of about 1.5 to 3 ounces, its textured top 14, and by having a fat content between about 12 and 30% by weight and preferably between about 17 and 25%. The biscuit sandwich 10 is shown on wrapping paper 11, which is preferably a wax paper-type material. The wrapper 11 should have some resistance to penetration by grease, some absorptive capacity for grease, and should also have a pleasant tactile feel to the outer surface. The assembled biscuit sandwich with meat and biscuit will preferably weigh between about 3 and 5 ounces. In FIG. 2, the biscuit sandwich 10 has been wrapped, and the wrapped biscuit 18 is shown with folded wrapping paper 11. A sticker 15 designates the type of meat on the biscuit sandwich. The sticker 15 may either be separate and placed on the wrapped biscuit 18, or may be preprinted on the outer surface of wrapping paper 11, together with a listing of ingredients and nutritional information.

The wrapped biscuits 18 are then bulk packaged in a container for distribution. As shown in FIG. 3, the preferable form of packaging is to place a plurality of wrapped biscuits 18 in a plastic sleeve 20, composed of a top web 21, and a bottom web 22. This is commonly referred to as form, fill and seal packaging. Preferably, approximately 3 to 12 biscuit sandwiches 18 are placed in a single sleeve 20, with 5 to 8 biscuit sandwiches per package being the most desirable range. This represents a compromise between the convenience of the store operator in bulk heating groups of biscuit sandwiches, and the possible waste that will occur if biscuit sandwich sales do not achieve the level necessary to sell all of the biscuit sandwiches 18 in a package 20 within their heated display shelf life. The number of biscuits 18 placed in a single package 20 is not critical, however, and may be varied according to the equipment of the manufacturer and the size of the biscuit sandwiches 18.

Preferably the packages 20 will be filled in a modified atmosphere process, with minimal oxygen content between about 0.2 to 0.5 percent to retard spoilage. Furthermore, the top web 21 and bottom web 22 should be selected from appropriate materials to provide oxygen and moisture barriers, sufficient strength to resist puncture from handling, and preferably will be transparent, provide a peelable seal between the top 21 and bottom 22 webs, and permit the printing of graphics, instructions, and other necessary information on the packaging. Also, it is desirable that the top web 21 and bottom web 22 be fabricated from microwaveable materials in the event a store operator should fail to follow directions to remove the biscuit sandwiches 10 before heating.

In accordance with these requirements, the top web 21 is preferably a 50 gram SARAN-coated polyester film, with the top surface printed and the bottom surface having an adhesive and a 0.0025 inch peelable low-density polyethylene ("LDPE") layer. This top web 21 is joined to the bottom web 22 which is preferably a 0.007 inch think 3-layer sandwich material, having a nylon outer layer, an ethylene vinyl alcohol copolymer ("EVOH") center layer, and an LDPE inner surface which mates with upper web 21.

Packages 20 of wrapped biscuits 18 are then distributed to store locations. The packaging techniques employed should give the biscuit sandwiches 18 a packaged shelf life of at least 20 days, and preferably about 30 days. Retail store locations will be provided with heated merchandisers 30 as shown in FIG. 4. A suitable lightweight merchandiser with a small countertop footprint is the Model 580 Mini Pizza Hutch available from Wisco Industries of Oregon, Wis. Merchandisers preferably have a thermostat-controlled heating unit in the base 31, preferably clear supporting walls and back 32, preferably clear hinged door 33 to permit consumer access, and a top with an optional sign board location 34 for promotional purposes. Illustrated merchandiser door 33 has handle 34 and hinges to facilitate customer access to the heated biscuit sandwiches 18. Also, the preferred merchandisers preferably substantially enclose the heated biscuit sandwiches 18 while still permitting the aroma of the heated sandwiches to escape sufficiently to be detected by consumers in the area of the merchandiser 30.

Stores are advised to keep the packaged biscuits 18 refrigerated at approximately 35 to 40 degrees Fahrenheit until ready for use. At these temperatures, the biscuits are not frozen and may be kept in refrigeration rather than freezer units. When it is desired to offer biscuit sandwiches 18 for sale, a package 20 of biscuit sandwiches 18 is opened at the store location. The biscuit sandwiches 18 are then placed in a microwave oven still wrapped in wrapping paper 11. Biscuit sandwiches 18 are then heated, typically requiring about 30 seconds of microwave time per biscuit sandwich 18, so that a sleeve of six biscuit sandwiches 18 would require microwave heating for approximately three minutes. Heating times may vary by microwave oven, and should be sufficient to bring the temperature of the product up to at least 140 degrees Fahrenheit. After the biscuit sandwiches 18 have been microwaved sufficiently, they are placed in the heated merchandiser 30, as shown in FIG. 4. Heated biscuits 18 are placed on a display pan 35 which is cleaned and sanitized by the store operator before being replaced in the merchandiser 30 every day. The thermostat of the heated merchandisers 30 should be set sufficiently high to maintain the biscuit sandwiches 18 at a minimum 140 degree Fahrenheit temperature. The display shelf life of the heated biscuit sandwiches 18 in the merchandiser 30 is approximately 4 hours. Biscuit components with lower fat contents than about 12% tend to become unacceptably hard and dry more quickly, and are less flavorful. The merchandiser 30 is preferably placed near the store check out counter or coffee machine, and permits the biscuit aroma to permeate the surrounding area to generate impulse sales. The customer who wishes to purchase a biscuit sandwich 18 may simply open the door 33 of heated merchandiser 30, and pick up a biscuit sandwich 18 and take it to the check out counter of the store. Not only does the paper wrapper 11 represent a pleasant tactile feel to the customer, but it permits the store operator to handle the biscuits 18 from package 20 to microwave and thence to heated merchandiser 30 in a sanitary fashion without actually touching the biscuit 10.

Figure 5:
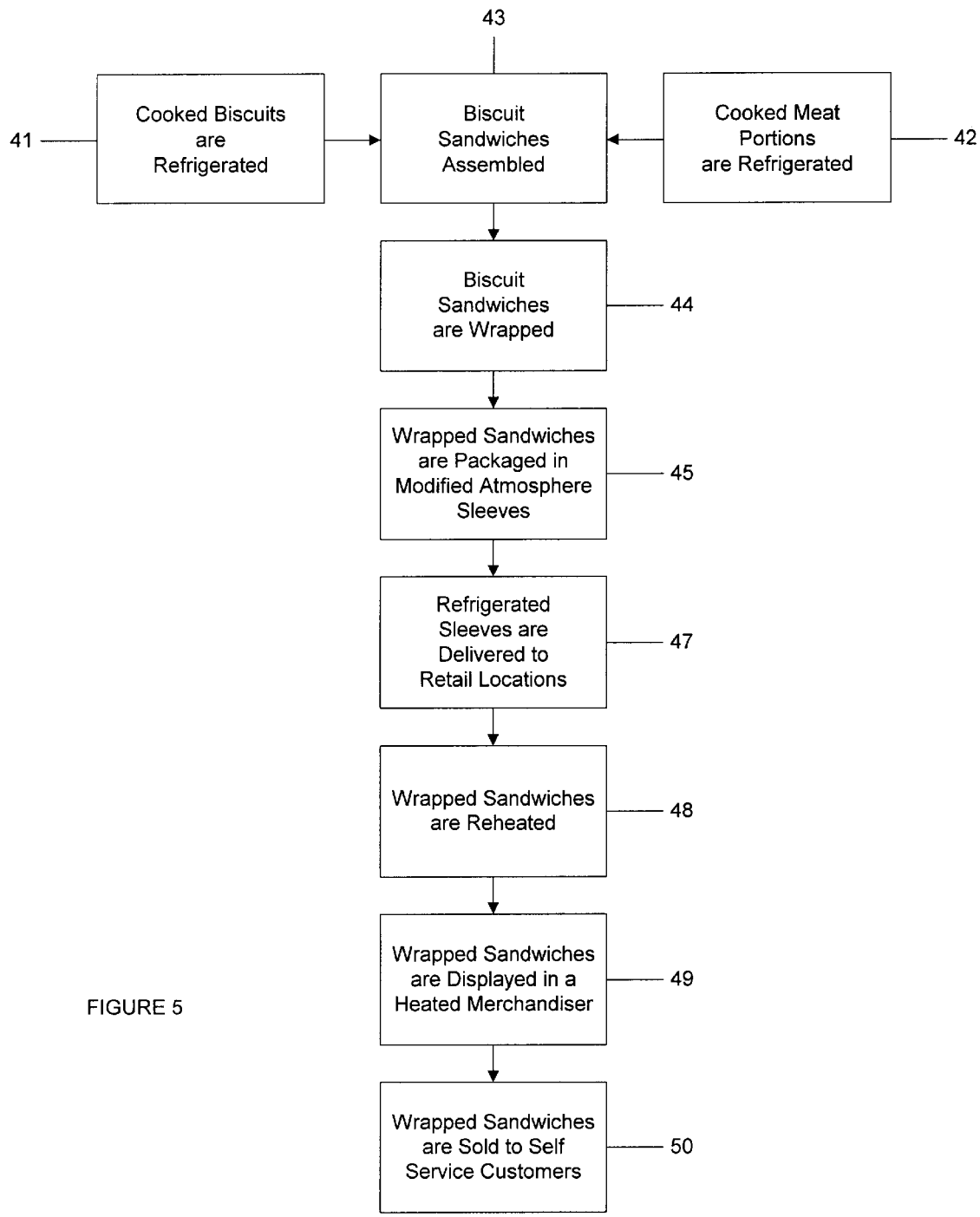
FIG. 5 is a flow chart describing the method of packaging, distributing, and selling biscuit sandwiches according to the present invention.

FIG. 5 provides a flow chart of the assembly and distribution process of the present invention. Specifically, cooked biscuits are refrigerated in step 41, and the cooked meat to be placed in the biscuit sandwich is refrigerated in step 42. Biscuits and meat are brought together in step 43 for assembly, which involves slicing the biscuits and inserting the meat 13 between the bottom 12 and top 14 portions of the biscuit. In step 44, the biscuit sandwiches 10 are wrapped in wrappers 11, and thence proceed to step 45 for modified atmosphere packaging into sleeves 20 as described in connection with FIG. 3. The sandwich biscuits 18 packaged in sleeves 20 remain refrigerated for delivery to individual store locations 47. When ready for use, packages 20 are opened at the store locations in step 48 and microwaved to a temperature of at least 140 degrees Fahrenheit. Then in step 49, the wrapped biscuit sandwiches 18 are placed in the merchandiser 30. Retail sales are enhanced by the aroma of the heated biscuits in at least the area surrounding the merchandiser 30. Finally, step 50 shows the successful sale of the biscuit sandwiches 18 to consumers.

Although the present invention has been described with reference to certain preferred embodiments disclosed in detail, it is to be understood that this is for the purpose of illustrating the invention, and should not be construed as necessarily limiting the scope of the invention since it is apparent that many changes may be made to the disclosed components and procedures by those skilled in the art to suit particular applications.

We claim:

1. A refrigerated bulk package of biscuit sandwiches having low oxygen content comprising:
   (a) at least three biscuit sandwiches, each assembled by placing a cooked meat portion between a top biscuit portion and a bottom biscuit portion;
   (b) a flexible wrapper about each of said at least three of biscuit sandwiches;
   (c) a transparent plastic bottom web having an edge within which the plurality of wrapped biscuit sandwiches are positioned; and
   (d) a top web having an edge joined to the edge of the bottom web and thereby encasing the plurality of wrapped biscuit sandwiches within said top and bottom webs.

2. The refrigerated bulk package of biscuit sandwiches of claim 1 wherein
   a designator for the type of biscuit sandwich is visible on the flexible wrapper.

3. The refrigerated bulk package of biscuit sandwiches of claim 1 wherein the oxygen content of the package is less than about 0.5 percent.

4. The refrigerated bulk package of biscuit sandwiches of claim 1 wherein a pocket to receive the at least three biscuit sandwiches is formed in the bottom web which is comprised of layers of nylon and EVOH.

5. The refrigerated bulk package of biscuit sandwiches of claim 1 wherein the edges of the top web and the bottom web are joined by a peelable seal.

6. The refrigerated bulk package of biscuit sandwiches of claim 1 wherein said at least three biscuit sandwiches are between from five to eight biscuit sandwiches.

7. The refrigerated bulk package of biscuit sandwiches of claim 1 wherein
   the cooked meat portions are selected from at least two of sausage, steak, chicken and ham.

8. The refrigerated bulk package of biscuit sandwiches of claim 1 wherein the biscuit portions have a fat content of between about 15% and about 25% by weight.

9. The refrigerated bulk package of biscuit sandwiches of claim 1 wherein the refrigerated shelf life of the biscuit sandwiches is at least 20 days.

10. A method for manufacturing and distributing biscuit sandwiches comprising the steps of:
    (a) assembling at least three biscuit sandwiches from a plurality of biscuit portions having a fat content by weight of about 20 percent and a plurality of cooked meat portions;
    (b) individually wrapping the at least three biscuit sandwiches in a flexible wrap having an outer surface displaying a designation of a type of biscuit sandwich;
    (c) packaging the at least three biscuit sandwiches in a modified atmosphere process so that the package contains between about 0.2% and 0.5% oxygen, by forming a pocket in a transparent bottom web with layers of EVOH and nylon, filling the pocket with the at least three biscuit sandwiches and joining a top web to the bottom web at their edges;
    (d) delivering the at least three packaged biscuit sandwiches to a retail location;
    (e) heating wrapped biscuit sandwiches at the retail location;
    (f) displaying heated, wrapped biscuit sandwiches at the retail location on a tray in a heated merchandiser having a thermostat controlled heat source beneath the tray and an enclosure with a transparent portion above the tray, said enclosure being sufficiently permeable to transmit some aroma from the heated biscuits to be detected near the heated merchandiser.

11. A refrigerated bulk package of biscuit sandwiches comprising:
    (a) at least three biscuit sandwiches, each assembled by placing a cooked meat portion between a top biscuit portion and a bottom biscuit portion;
    (b) a flexible wrapper about each of said at least three of biscuit sandwiches;
    (c) a transparent plastic bottom web having an edge within which the plurality of wrapped biscuit sandwiches are positioned;
    (d) a top web having an edge joined to the edge of the bottom web and thereby encasing the plurality of wrapped biscuit sandwiches within said top and bottom webs; and
    (e) wherein said bulk package of biscuit sandwiches has a shelf life of at least about 20 days without freezing.

12. The refrigerated bulk package of biscuit sandwiches of claim 11 wherein a designator for the type of biscuit sandwich is visible on the flexible wrapper.

13. The refrigerated bulk package of biscuit sandwiches of claim 11 wherein the oxygen content of the package is between about 0.2 and about 0.5 percent.

14. The refrigerated bulk package of biscuit sandwiches of claim 11 wherein a pocket to receive the at least three biscuit sandwiches is formed in the bottom web which is comprised of layers of nylon and EVOH.

15. The refrigerated bulk package of biscuit sandwiches of claim 11 wherein the edges of the top web and the bottom web are joined by a peelable seal.

16. The refrigerated bulk package of biscuit sandwiches of claim 11 wherein said at least three biscuit sandwiches are between from five to eight biscuit sandwiches.

17. The refrigerated bulk package of biscuit sandwiches of claim 11 wherein the cooked meat portions are selected from at least two of sausage, steak, chicken and ham.

18. The refrigerated bulk package of biscuit sandwiches of claim 11 wherein the biscuit portions have a fat content of between about 15% and about 25% by weight.

* * * * *